No. 12,407. REISSUED NOV. 14, 1905.

F. J. BACON.

HORSESHOE.

APPLICATION FILED AUG. 23, 1905.

Witnesses:

Jas. F. Coleman

Jno. Robt Taylor

Inventor

Frederick J. Bacon

By Dyer & Dyer

Attorneys.

UNITED STATES PATENT OFFICE.

FREDERICK J. BACON, OF HARTFORD, CONNECTICUT, ASSIGNOR, BY DIRECT AND MESNE ASSIGNMENTS, TO THE ALWAYS SHARP HORSE SHOE CALK MANUFACTURING COMPANY, OF HARTFORD, CONNECTICUT, A CORPORATION OF CONNECTICUT.

HORSESHOE.

No. 12,407. Specification of Reissued Letters Patent. Reissued Nov. 14, 1905.

Original No. 744,277, dated November 17, 1903. Application for reissue filed August 23, 1905. Serial No. 275,495.

*To all whom it may concern:*

Be it known that I, FREDERICK J. BACON, a citizen of the United States, residing at Hartford, in the county of Hartford and State of Connecticut, have invented certain new and useful Improvements in Horseshoes, of which the following is a specification.

This invention has for its object to prevent shod animals from slipping on slimy and ice-covered surfaces, and relates to a novel form of shoe and calks, the latter comprising laminæ of different lengths and having a progressive arrangement whereby when the edge of one lamina becomes worn the edge of the next lamina in order comes into play, and so on throughout the series, thereby obviating frequent sharpening of the calks and at the same time always having a sharp edge to make positive engagement with the slippery surface and insure a firm footing. To further guard against slipping and to relieve the animal of the jar incident to traveling over stone and analogous hard pavements, the shoe is provided with a block or pad of rubber or like material and granules or broken particles of emery, quartz, or similar hard material embedded therein, said pad being fitted to the tread side of the shoe and preferably secured in a recess formed therein.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
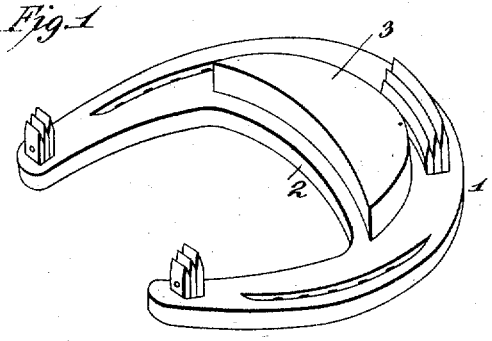
Figure 2:
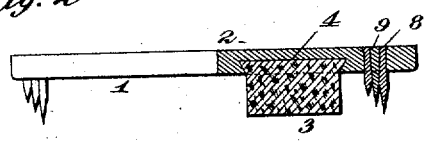
Figure 3:
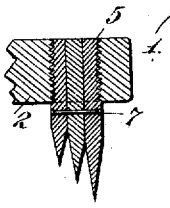
Figure 4:
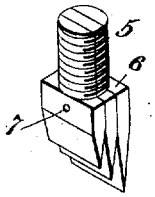
Figure 5:
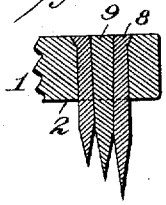
Figure 6:
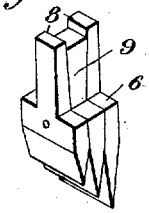
Figure 7:
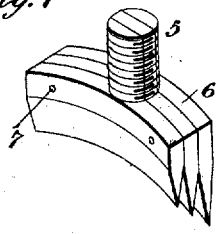

Figure 1 is a perspective view of a horseshoe embodying the invention. Fig. 2 is a central longitudinal section thereof. Fig. 3 is a sectional view showing the calk provided with a threaded shank. Fig. 4 is a perspective view of a heel-calk having a threaded shank. Fig. 5 is a view similar to Fig. 3, showing the calk having a square shank and secured to the shoe by riveting or upsetting the terminal portions of the shank members. Fig. 6 is a perspective view of a calk, showing a square shank. Fig. 7 is a perspective view of a toe-calk having a threaded shank.

Corresponding and like parts are referred to in the following description and indicated in all the views of the drawings by the same reference characters.

The shoe 1 is of usual shape and may be cast, drop-forged, or constructed in any manner found most advantageous. The toe portion is widened, as shown at 2, preferably for reception of the block or pad 3 for cushioning the blow and materially assisting in preventing slipping. The widened portion 2 is provided upon its under side with a recess 4, in which the pad 3 is secured, the walls of the recess being undercut to make positive engagement with the pad, which is forced into the recess and beneath the inwardly-extending walls, as shown most clearly in Fig. 2. The pad or block 3 is preferably of crescent form and comprises rubber as a base and granules or broken particles of emery, quartz, mineral, or other hard substance, the same being embedded in the rubber and serving to prevent slipping by contact of the sharp edges of the particles with the surface. The antislipping and cushioning pad may be secured to the shoe by cement or in any substantial way and may be of any depth corresponding to the calks, so as to supplement the action of said calks in preventing slipping of the animal when traveling over slimy and ice-covered surfaces.

The shoe is provided with toe and heel calks of like formation, each being composed of laminæ or layers of metal secured together and having the end or edge portions sharpened to form edges. The laminæ or layers of each calk constitute teeth which vary in length in progressive order, whereby the edges of the several layers come into play in succession, thereby insuring a sharp edge being always had to make positive contact with the surface to insure a firm footing of the animal shod with shoes embodying the invention. The calk will therefore have teeth varying in length and having a progressive arrangement, each of the teeth having its projecting portion sharpened, the cutting edges of the several teeth coming successively into operative position as the edge of the preceding tooth becomes worn or dull. The heel-calks are narrow compared with the toe-calk, the latter being of a length to extend around the toe portion of the shoe and curved to conform to the outline thereof. The calks are provided with shanks integral therewith, which may be threaded, as shown at 5 in Figs. 3, 4, and 7, or said shanks may be square and plain-sided, as shown in Figs. 5 and 6. Shoulders 6 are formed at the base of the shanks and bear against the under side of the shoe and sustain the weight and blow. The calks may comprise any number of laminæ or layers, which may be secured together solely by means of the shank portions being confined in the opening of the horseshoe or by means of pins 7 passed through openings formed in the laminæ, as shown in Figs. 3, 4, 6, and 7. In the construction of calk having its shank of angular or square formation, as shown in Figs. 5 and 6, the opening in the shoe will be of a shape corresponding to a cross-section of the shank, and after the latter has been secured in the opening the calk is prevented from turning. This shank, in connection with the opening of similar shape in the shoe, constitutes a means for securing proper alinement of the calk in relation to the shoe and prevents twisting of the shank in the supporting-opening, which would cause the teeth of the calk to improperly engage with the ground. This means for securing a proper alinement of the parts may be obtained in other ways, as may be necessary or desirable. The calk may be secured to the shoe in any determinate way, either by the screw-threads, as illustrated, or by having portions of the shank upset or riveted, as shown at 8.

In the form of calk secured to the shoe by riveting or upsetting the shank portions of the outermost laminæ are extended beyond the shank portion of the intermediate layer, and these extended portions are upset after the calk has been properly fitted to the shoe. In order that the intermediate layer may be retained in place, its shank portion is made of wedge shape, as shown at 9, said layer being prevented from upward displacement by the shoulders at the base of the wedge portion 9 and from downward displacement by the oppositely-inclined faces of the part 9 engaging with the corresponding inclined faces of the adjacent shank portions of the laminæ or layers. The edge portions of the layers are beveled upon opposite sides, so as to bring the cutting edge of the layers at a point intermediate of parallel planes touching the faces or sides of the respective layers. This form of calk may be readily removed from the shoe by prying up the upset shank portions of the outermost laminæ until they are straight again, which will permit the calk to come out very easily. In order to permit the shank portions to be upset or riveted, they are left soft and not hardened, and the upset portions may be readily pried up. The form of calk shown in Figs. 3, 4, and 7 may be readily removed by unscrewing.

In forming the calks the layers must be sufficiently stout to resist the strain and pounding action, and tempered steel is the preferable material. When the edge of the longest layer or element becomes dull and worn, the sharp edge of the layer next in order comes into play to bite into the surface and prevent slipping, and when the second edge becomes dull and worn the cutting edge of the third layer comes into position to make positive contact with the surface to insure firm footing of the animal. It will thus be seen that as the calk wears away a cutting edge proportionately comes into position to perform the desired work, thereby obviating the necessity for removal of the calk at frequent intervals for sharpening.

Having thus described the invention, what is claimed as new is—

1. A horseshoe-calk having teeth varying in length and having a progressive arrangement, each of the teeth having its projecting portion sharpened, the cutting edges of the several layers coming successively into operative position as the edge of the preceding tooth becomes worn or dull, and means for removably securing the calk to a horseshoe.

2. A horseshoe-calk having teeth varying in length and having a progressive arrangement, each of the teeth having its projecting portion sharpened, the cutting edge of the several teeth coming successively into operative position as the edge of the preceding tooth becomes worn or dull, the said calk having a shank integral therewith, and means for securing the shank to the shoe.

3. A horseshoe-calk having teeth varying in length and having a progressive arrangement, each of the teeth having its projecting portion sharpened, the cutting edge of the several teeth coming successively into operative position as the edge of the preceding tooth becomes worn or dull, the said calk having means for removably securing it to the horseshoe, and means for alining the calk in relation to the shoe.

4. A horseshoe-calk comprising laminæ or layers varying in length and having a progressive arrangement and having a shank formed of integral portions of the respective layers, substantially as set forth.

5. A horseshoe-calk comprising a body and shank portions formed of corresponding layers, the outermost shank elements being extended and adapted to be secured to the shoe by being upset or riveted, and the intermediate shank portion having interlocking connection with the outermost shank members, substantially as specified.

6. A horseshoe-calk comprising body and shank portions composed of corresponding layers, the shank portion of the innermost layer being of approximately wedge shape to prevent downward displacement of the intermediate layer when the calk is in place, substantially as set forth.

This specification signed and witnessed this 10th day of August, 1905.

FREDERICK J. BACON.

Witnesses:

MAY A. CONWAY,

THOMAS J. SPELLACY.